United States Patent
Olsson et al.

(10) Patent No.: US 8,050,634 B2
(45) Date of Patent: Nov. 1, 2011

(54) TRANSCEIVER WITH ISOLATED RECEIVER

(75) Inventors: Torbjörn Jan Evert Olsson, Södra Sandby (SE); Eric Westesson, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 835 days.

(21) Appl. No.: 12/105,577

(22) Filed: Apr. 18, 2008

(65) Prior Publication Data

US 2009/0264084 A1    Oct. 22, 2009

(51) Int. Cl.
H04B 1/44    (2006.01)

(52) U.S. Cl. ............... 455/78; 455/73; 455/88; 455/83; 455/277.1; 370/282; 370/441; 340/825.65; 340/825.69; 340/539.1

(58) Field of Classification Search .............. 455/78, 455/83, 88, 73, 277.1; 370/282, 342, 441, 370/347; 340/825.65, 825.69, 539.1, 825.72
See application file for complete search history.

(56) References Cited

U.S. PATENT DOCUMENTS

| | | | |
|---|---|---|---|
| 4,641,365 A | | 2/1987 | Montini, Jr. |
| 5,530,612 A | | 6/1996 | Maloney |
| 5,576,920 A | | 11/1996 | Kosuga et al. |
| 5,862,133 A | * | 1/1999 | Schilling ................. 370/342 |
| 6,061,359 A | * | 5/2000 | Schilling et al. ............ 370/441 |
| 6,122,486 A | * | 9/2000 | Tanaka et al. .................. 455/68 |
| 6,157,271 A | * | 12/2000 | Black et al. ................... 332/127 |
| 6,160,803 A | * | 12/2000 | Yuen et al. .................... 370/342 |
| 6,356,536 B1 | * | 3/2002 | Repke ........................... 370/282 |
| 6,636,118 B1 | | 10/2003 | Kusano et al. |
| 6,671,146 B1 | | 12/2003 | Hashimoto et al. |
| 6,759,969 B2 | * | 7/2004 | Lund ........................ 340/870.02 |
| 6,809,574 B1 | * | 10/2004 | Kiani ............................ 327/538 |
| 7,138,885 B2 | | 11/2006 | Karlsson et al. |
| 7,224,949 B2 | | 5/2007 | Kluge et al. |
| 7,315,438 B2 | | 1/2008 | Hargrove et al. |
| 7,356,310 B2 | * | 4/2008 | Rofougaran et al. ......... 455/66.1 |
| 7,400,862 B2 | * | 7/2008 | Domino et al. ................ 455/78 |
| 7,505,010 B2 | * | 3/2009 | Franzon et al. ................ 343/757 |
| 7,548,726 B1 | * | 6/2009 | Rofougaran .................... 455/20 |
| 7,555,263 B1 | * | 6/2009 | Rofougaran et al. ........... 455/20 |
| 7,558,556 B1 | * | 7/2009 | Moloudi et al. .............. 455/323 |
| 7,664,468 B2 | * | 2/2010 | Wong et al. ..................... 455/78 |

(Continued)

FOREIGN PATENT DOCUMENTS

EP    1301017 A1    4/2003

(Continued)

OTHER PUBLICATIONS

International Preliminary Examination Report with Annexes for International Application PCT/EP2009/054390 mailed Apr. 14, 2010.

(Continued)

*Primary Examiner* — Marceau Milord

(74) *Attorney, Agent, or Firm* — Potomac Patent Group PLLC

(57) ABSTRACT

A transceiver includes a transmitter configured to transmit a first radio frequency signal, a switching device connected to the transmitter and configured to receive and transmit the first radio frequency signal to an antenna, a receiver connected to the switching device via an input and configured to receive a second radio frequency signal from the switching device, the receiver including an electrostatic discharge protection device connected to the input, and a biasing device connected to the electrostatic discharge protection device and configured to forward bias the electrostatic discharge protection device.

17 Claims, 7 Drawing Sheets

U.S. PATENT DOCUMENTS

| | | | |
|---|---|---|---|
| 7,697,900 B2 * | 4/2010 | Moloudi et al. | 455/78 |
| 7,720,444 B2 * | 5/2010 | Darabi et al. | 455/73 |
| 7,769,391 B2 * | 8/2010 | Andersson et al. | 455/453 |
| 7,860,454 B2 * | 12/2010 | Moloudi et al. | 455/20 |
| 2004/0235427 A1 | 11/2004 | Reithinger | |
| 2007/0004373 A1 | 1/2007 | Kasha et al. | |
| 2007/0218852 A1 | 9/2007 | Huynh | |
| 2007/0248069 A1 | 10/2007 | Kim | |

FOREIGN PATENT DOCUMENTS

JP      5259770      10/1993

OTHER PUBLICATIONS

International Search Report for PCT/EP2009/054390 mailed Aug. 12, 2009.

Written Opinion for PCT/EP2009/054390 mailed Aug. 12, 2009.

* cited by examiner

TRANSCEIVER WITH ISOLATED RECEIVER

TECHNICAL FIELD

The present invention generally relates to radio frequency transceivers and, more particularly, to mechanisms and devices for isolating electric receiving circuits from the energy of radio frequency transmissions.

BACKGROUND

During the past years, the interest in radio access technologies for providing services for voice, video and data has increased. The communication devices that support these services, for example, mobile cellular units, include a transmitting component for transmitting information associated with voice, video and/or data to a base station (for example the base station of a telecommunication network) and a receiving component for receiving information associated with voice, video and/or data received from the base station.

FIG. 1 shows a communication device 10 that includes such a transmitting component 12 and a receiving component 14. The two components may be connected to a circulator 16. The circulator 16 may switch a connecting path of either the transmitter or receiver to a common antenna 18. The circulator 16 passes a transmit signal to the antenna with low attenuation, but should not pass the transmit signal to the receiver. A limitation of using such a circulator is that transmit power reflected by the antenna or leaked directly from a power amplifier of the transmitter may be conducted by the circulator 16 to the receiver as the circulator cannot completely close a communication path between the transmitter and the receiver. This may damage the receiver because the receiver is not designed to handle the high energy signals generated by the transmitter.

To protect the receiver from such high energy signals, a low-ohmic switch 19 may be used in addition to the circulator 16, to prevent the high energy signal entering the receiver 14. The switch 19 may be implemented by using a large MOSFET. However, a drawback of this solution is that the MOSFET might introduce losses in the signal path that degrade the receiver characteristics when the receiver is on, which is undesirable. In addition, another drawback is the amount of space needed to accommodate the large MOSFET and the cost for adding the MOSFET, especially since modern mobile communication devices have limited amounts of available space and are sensitive to cost.

Accordingly, it would be desirable to provide devices and methods for insulating the receiver from the transmitter that avoid the afore-described problems and drawbacks.

SUMMARY

According to one exemplary embodiment, a transceiver includes a transmitter configured to transmit a first radio frequency signal; a switching device connected to the transmitter and configured to receive and transmit the first radio frequency signal to an antenna; a receiver connected to the switching device via an input and configured to receive a second radio frequency signal from the switching device, the receiver including an electrostatic discharge protection device connected to the input; and a biasing device connected to the electrostatic discharge protection device and configured to forward bias the electrostatic discharge protection device.

According to another exemplary embodiment, a mobile communication device includes a transceiver that includes: a transmitter configured to transmit a first radio frequency signal; a switching device connected to the transmitter and configured to receive and transmit the first radio frequency signal to an antenna; a receiver connected to the switching device via an input and configured to receive a second radio frequency signal from the switching device, the receiver including an electrostatic discharge protection device connected to the input; and a biasing device connected to the electrostatic discharge protection device and configured to forward bias the electrostatic discharge protection device.

According to still another exemplary device, there is a method for biasing a transceiver that transmits and receives radio frequency signals. The method includes transmitting from a transmitter a first radio frequency signal; leaking a second radio frequency signal, which is associated with the first radio frequency, to a receiver path, the receiver path including an electrostatic discharge protection device and other receiver circuitry; and forward biasing the electrostatic discharge protection device with a biasing device to prevent the second radio frequency signal from reaching the other receiver circuitry.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a mobile telecommunication device. However, the embodiments to be discussed next are not limited to these systems but may be applied to other communication systems.

Reference throughout the specification to "one embodiment" or "an embodiment" means that a particular feature, structure, or characteristic described in connection with an embodiment is included in at least one embodiment of the present invention. Thus, the appearances of the phrases "in one embodiment" or "in an embodiment" in various places throughout the specification do not necessarily refer to the same embodiment. Further, the particular features, structures or characteristics may be combined in any suitable manner in one or more embodiments.

Figure 2:
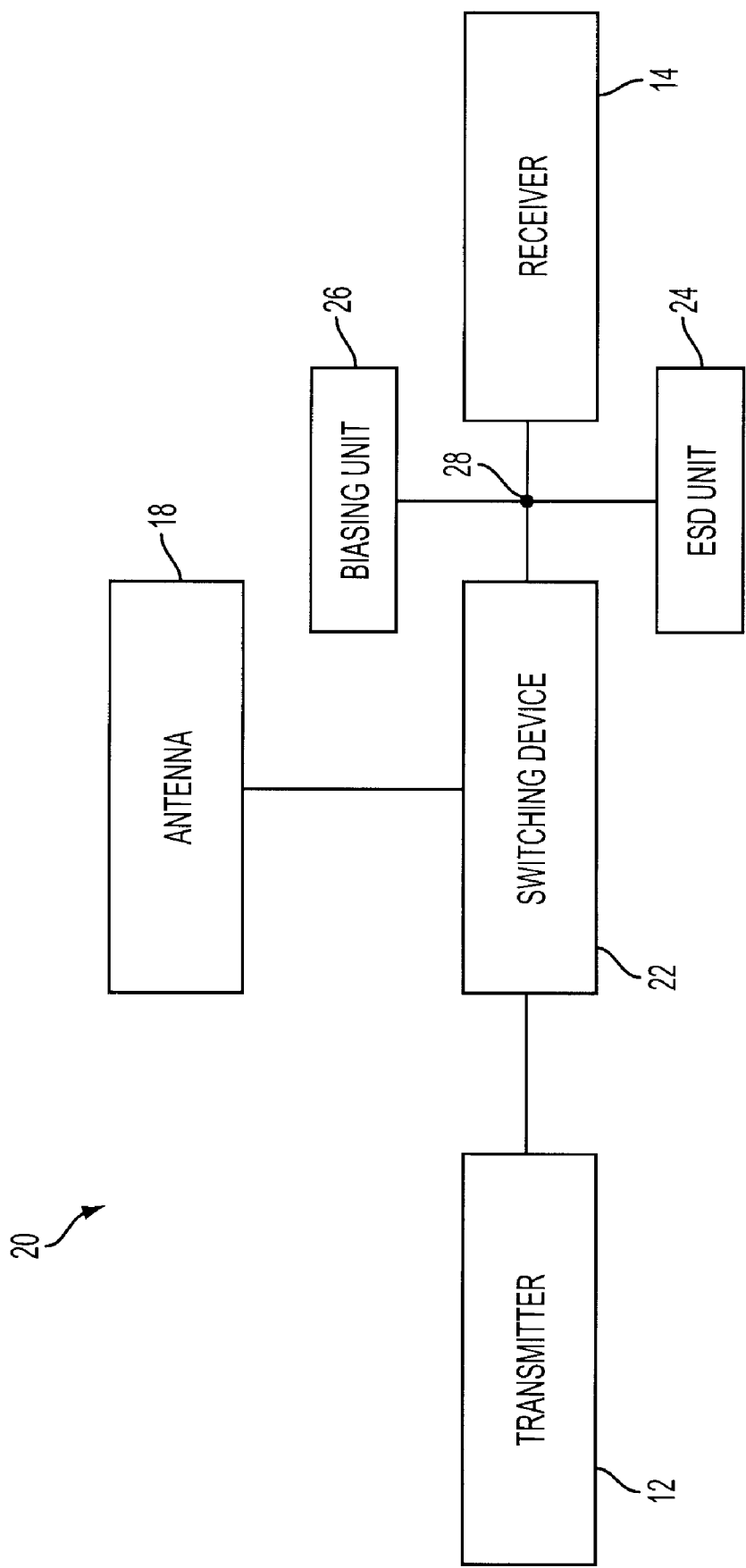
FIG. 2 is a schematic diagram of a communication device according to an exemplary embodiment.

As shown in FIG. 2, according to an exemplary embodiment, a communication device 20 includes the transmitter 12, the receiver 14, and a switching device 22 for selectively connecting the transmitter 12 or the receiver 14 to the antenna 18. The communication device 20 may also include an electrostatic discharger unit 24 and a biasing unit 26. Although the discharger unit 24 and the biasing unit 26 are shown in FIG. 2 as not being part of the receiver 14, these two units are, according to another exemplary embodiment, part of the receiver 14.

The electrostatic discharger unit 24 is present in the receiver 14 for the following reasons. Electrostatic Discharge (ESD) is one of the most common sources of electrical overstress, which produces transient voltages presenting a considerable hazard to the components of the communication devices. The duration of ESD transients is, for example, in the range of less than 100 nanoseconds up to several microseconds. The voltage magnitudes of the transients may range, for example, from a few tens of volts up to more than 10 kV. These voltages might be fatal for the electronic components of the receiver, i.e., a low noise amplifier, application specific integrated circuit components, etc., which are designed to work with a voltage around 2.5 to 5 V.

Figure 1:
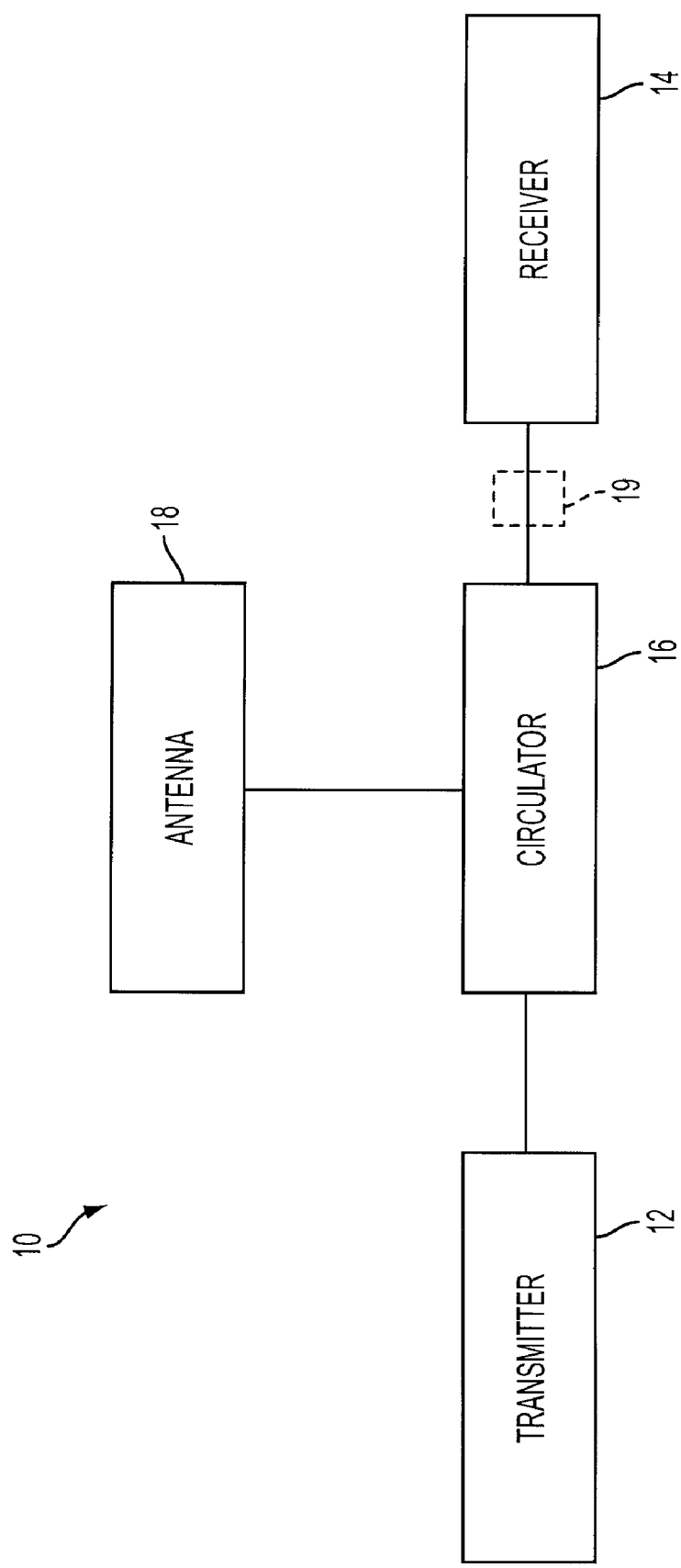
FIG. 1 is a schematic diagram of a communication device including a transmitter and a receiver.

Transients enter electronic circuits by conduction or through radiation transferred by electromagnetic coupling. An antenna is one possible gate for these transients. Another possible gate is the coupling between the transmitter and the receiver shown in FIG. 1. Thus, electronic components of the receiver may be protected by limiting the voltage spikes of an ESD, which represent the actual hazard. This may be achieved by using protection circuits, for example transient voltage suppressors, which clamp the transient voltage to a value harmless for the exposed down-stream circuitry, i.e., components of the receiver. FIG. 2 shows such a protection circuit as the ESD protection unit 24. The protection circuit 24 is connected to the receiver 14 at an input 28 of the receiver 14.

Figure 3:
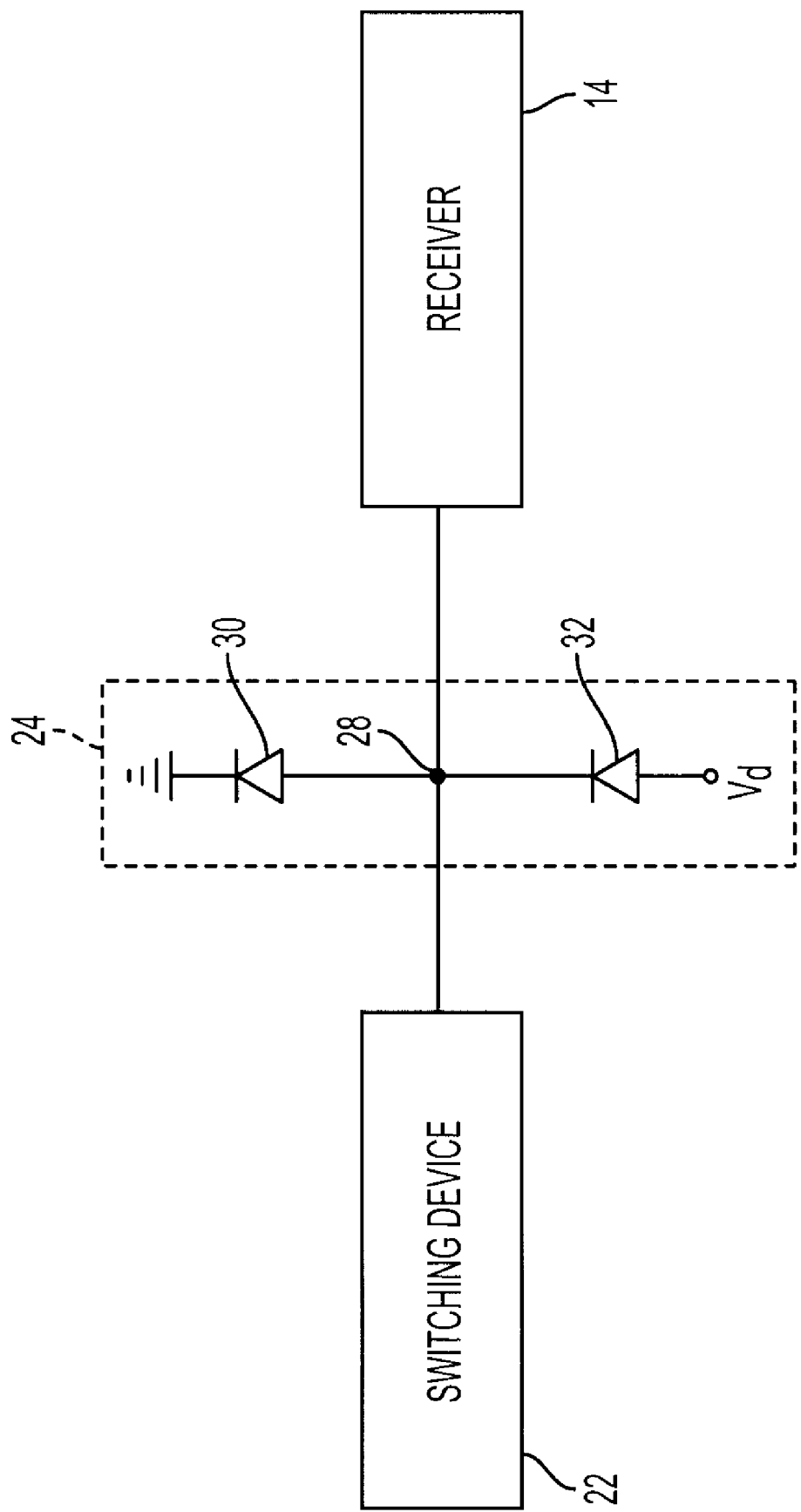
FIG. 3 is a schematic diagram of an electrostatic discharge protection device connected to a receiver according to an exemplary embodiment.

According to an exemplary embodiment shown in FIG. 3, the ESD unit 24 may include a first diode 30 and a second diode 32, each connected to the input 28 of the receiver 14. The two diodes are connected in antiparallel and diodes 30 and 32 may prevent an incoming signal from rising above the positive voltage supply Vd of the receiver or falling below the ground voltage by more than one forward diode voltage drop.

In the exemplary embodiment of FIG. 3, the diodes 30 and 32 are kept at zero bias (i.e., no bias is applied) to have a negligible impact on the signal path. However, the ESD protection unit 24 may be used, in addition to providing ESD protection, to also provide an insulation of the receiver components from the high energy RF signals that might leak from the transmitter 12 to the receiver 14 via the switching device 22. Thus, according to an exemplary embodiment, the ESD unit has a dual role, ESD protection and high energy RF signal protection.

To achieve the high energy RF signal protection, the ESD unit 24 is biased by the biasing unit 26 during a time when the receiver is idle or the transmitting device sends the RF signal. In an exemplary embodiment, the diode 30 of the biasing unit 26 may be forward biased to produce a low input impedance to reduce the interference currents or transients that might be entering the receiver. The forward biased diode 30 of the ESD protection unit then acts as a low ohmic switch to ground for the transients. Thus, according to this exemplary embodiment, at least a diode is forward biased to achieve high energy RF signal protection.

Figure 4:
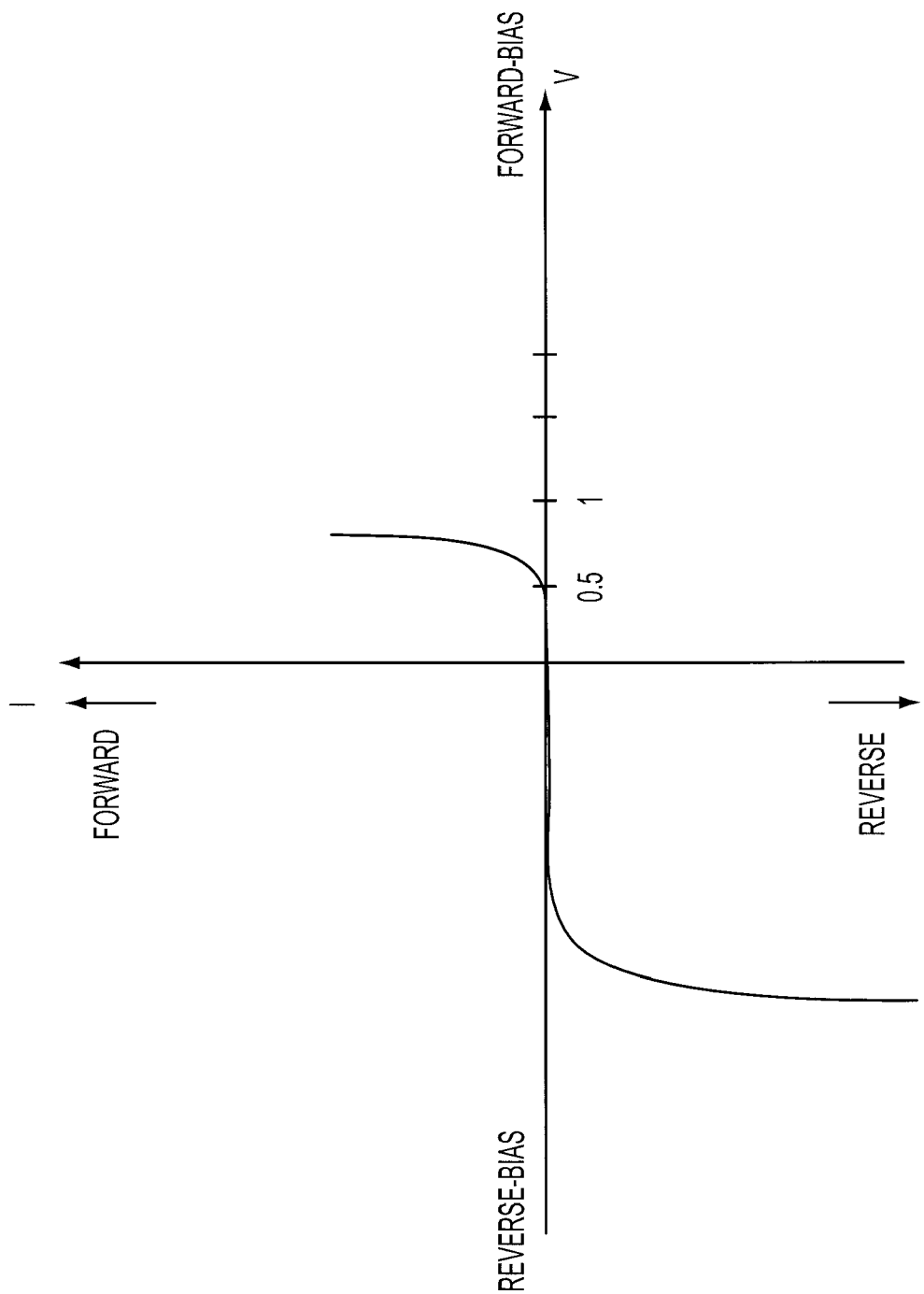
FIG. 4 is a graph showing a current voltage characteristics of a diode.

The low ohmic switch achieved by forward biasing diode 30 is discussed next in more detail. FIG. 4 shows a current-voltage characteristic for a silicon diode. The diode has a forward region in which the diode forward conducts a current. The diode opens at around 0.5 V and might conduct a large current around 0.7 V due to the diode non-linear characteristic. The diode also has a reverse region. When a positive voltage is applied to the diode and the diode starts conducting, the diode is considered to be forward biased. The applied voltage that forward biases the diode has a range between a lower bound, for example 0.5 V for the diode described in FIG. 4, up to an upper bound, which depends on the type of diode used. As will be understood by those skilled in the art, the above discussed numbers and characteristics of a diode are diode specific and are for exemplary purposes.

An impedance Z of the diode is variable, depending on the applied voltage. For example, with regard to FIG. 4, the diode has high impedance between 0V and 0.5V and low impedance from 0.5V onwards. Thus, the diode has low impedance when it is forward biased and high impedance when it is not forward biased. Based on this property, the low ohmic switch discussed above with regard to FIG. 3 may be achieved by having the diode 30 forward biased. The forward bias voltage may take any value equal to or larger than a voltage that opens the diode. However, according to an exemplary embodiment, the forward bias voltage is maintained around the voltage that opens the diode, in order not to drain the power source (not shown) of the communication device. It is noted in this respect that FIG. 4 shows that the closer the bias voltage is to the voltage that opens the diode, the smaller the current, and thus the smaller the drain on the power source.

Figure 5:
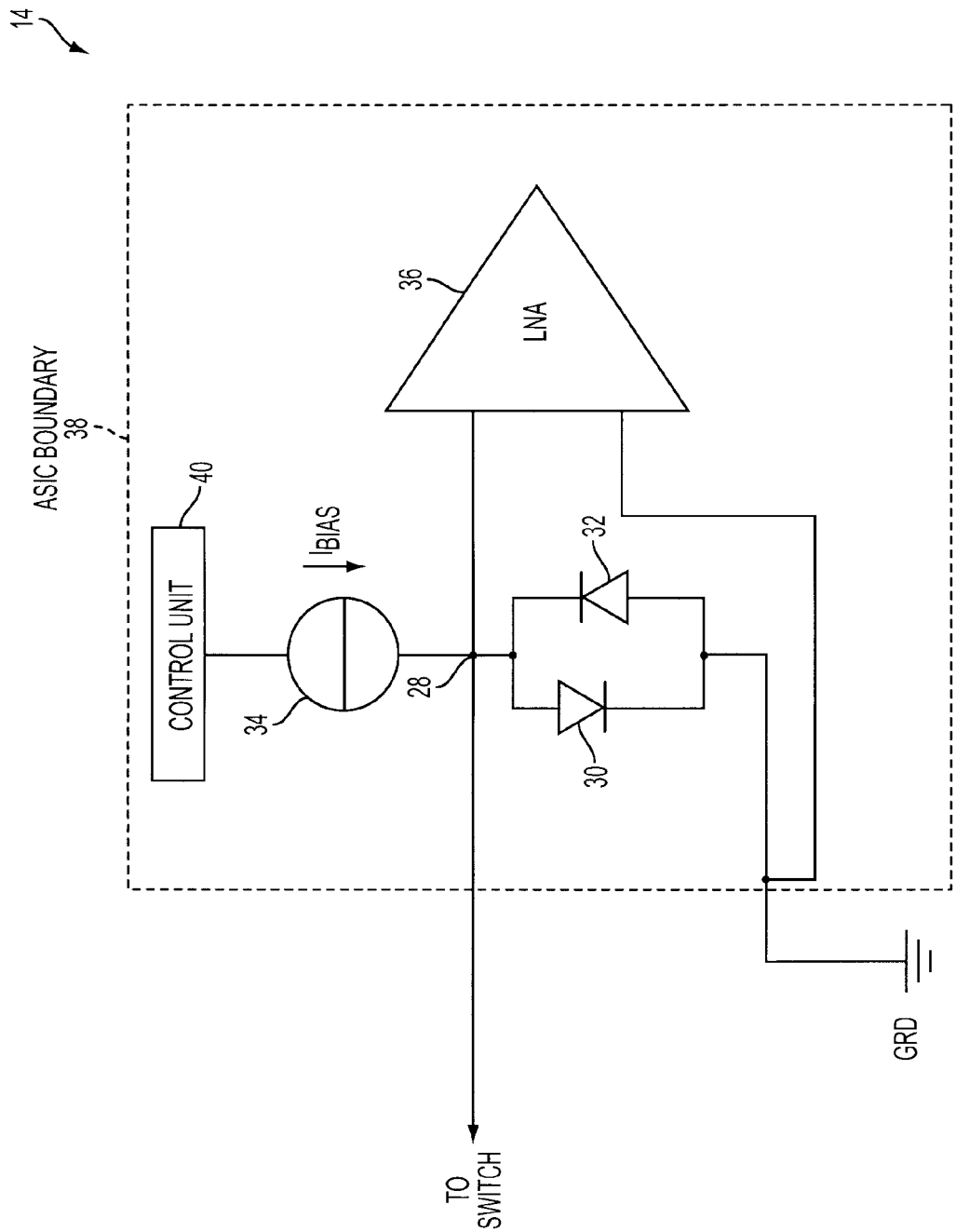
FIG. 5 is a schematic diagram of the receiver according to an exemplary embodiment.

According to an exemplary embodiment shown in FIG. 5, a biasing device 34 is provided to bias at least diode 30 of the ESD protection unit 24. The diode 32 is not necessary for the protection of the receiver from high energy RF signal. The biasing device 34 may be, for example, one of a current source or a voltage source. More specifically, the biasing device 34 may include, for example, at least one of a transistor, a resistor, one or more diodes, and an inductor or a combination of these elements. FIG. 5 also shows a low noise amplifier 36 that may be provided on the ASIC 38, which is part of the receiver 14. The ASIC 38 may be configured or may include a control unit 40 configured to control the biasing device 34. The control unit 40 may be configured to control the biasing device 34 to forward bias diode 30 when the receiver 14 or LNA 36 is idle or when the transmitter 12 is transmitting radio frequency signals. The biasing device 34 may be connected to the input 28, similar to the diodes 30 and 32, of the receiver 14. Thus, according to an exemplary embodiment, one end of the diode 30 is directly connected to the biasing device 34 and the other end of the diode 30 is connected to ground GRD. The diodes 30 and 32 may be connected antiparallel to each other. The diode 30 may be a Zener diode, a transient suppression diode, a Schottky diode, or other diodes used for ESD protection.

Figure 6:
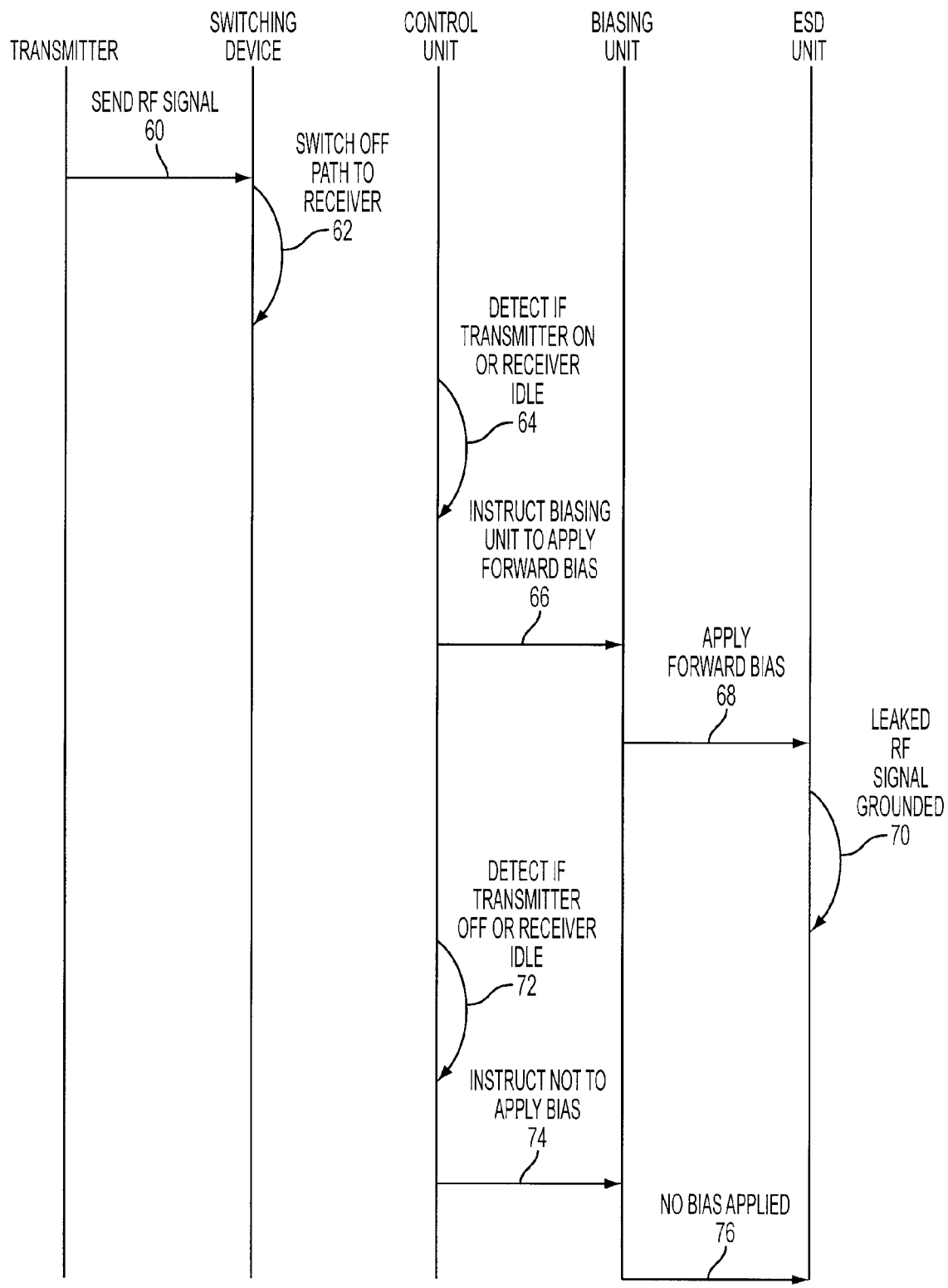
FIG. 6 shows steps for controlling the receiver according to an exemplary embodiment.

According to an exemplary embodiment illustrated in FIG. 6, an operation of the biasing unit 34 and the control unit 40 is discussed next. Suppose that the transmitter 12 is sending an RF signal in step 60. At this time, the switching device 22 switches off the path to the receiver 14 in step 62, to prevent the RF signal reaching the receiver 14 and switches on a path from the transmitter 12 to the antenna 18. However, in communication devices not equipped with other protection device, a leak still occurs through the switching device 22 to the receiver 14. A detection unit that may be or not part of the control unit 40, detects in step 64 whether the transmitter 12 is on or whether the receiver 14 is idle and informs accordingly the control unit 40. As an exemplary situation, consider that the control unit 40 is informed that the transmitter is on.

Based on this information, the control unit 40 instructs in step 66 the biasing unit 34 to apply a forward bias to the diode 30. The biasing unit 34 applies in step 68 the forward bias to diode 30 to achieve the low ohmic path to ground. Thus, the potentially leaked RF signal is grounded in step 70 via the low ohmic path created by the forward biased diode 30. The detection unit continues in step 72 to detect whether the transmitter is on. When the transmitter is off, the control unit 40 instructs in step 74 the biasing unit 34 to not bias the diode 30. Thus, in step 76, the biasing unit 34 ceases to bias the diode 30. The diode 30 is not biased when either the transmitter is off or when the receiver is on (i.e., processing a received signal).

Figure 7:
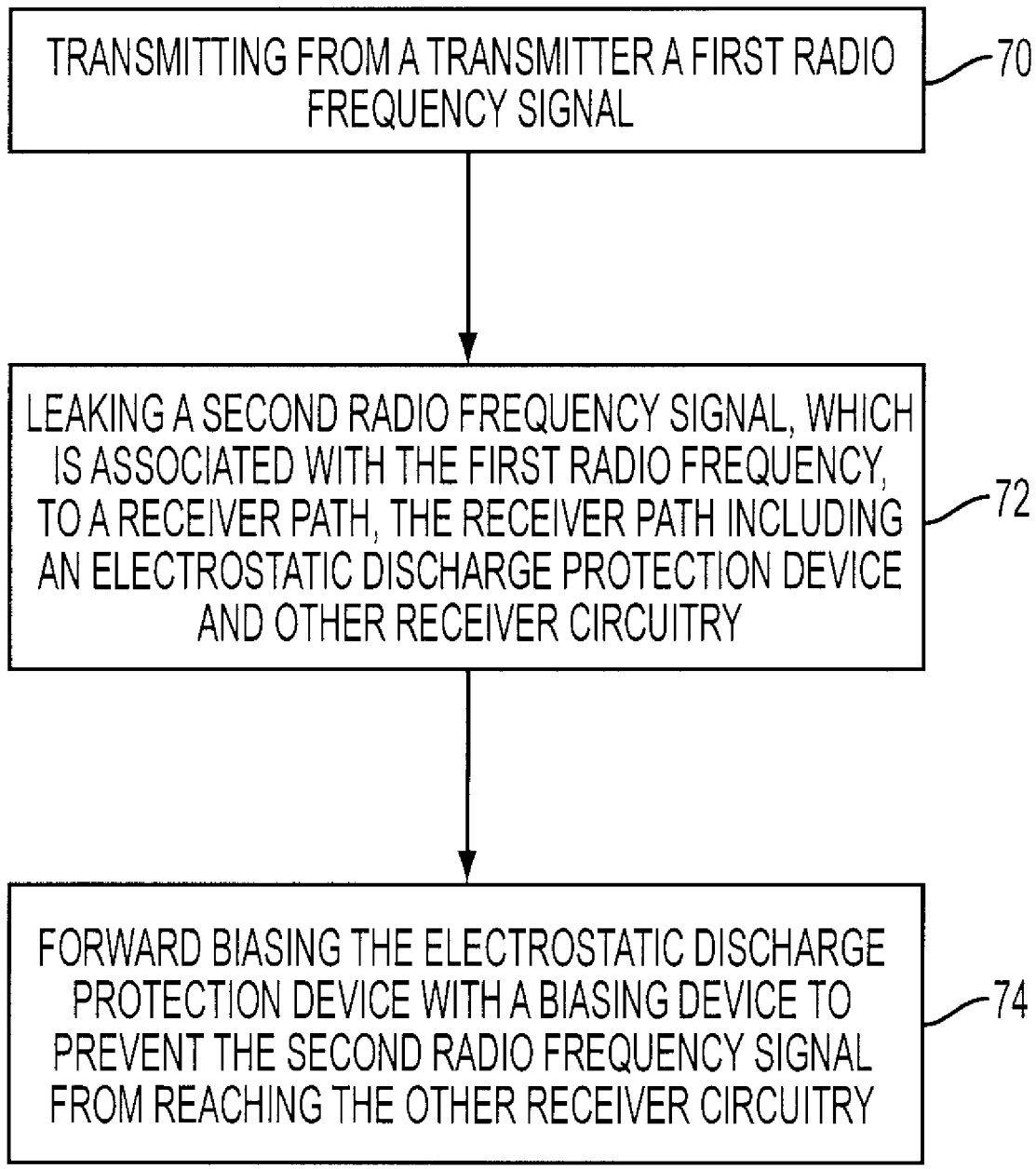
FIG. 7 is a flow chart showing steps for using the communication device according to an exemplary embodiment.

A method for operating a communication device of at least one of the exemplary embodiments discussed above is illustrated in FIG. 7. According to the method, a step 70 transmits from a transmitter a first radio frequency signal, a step 72 leaks a second radio frequency signal, which is associated with the first radio frequency, to a receiver path, the receiver path including an electrostatic discharge protection device and other receiver circuitry, and a step 74 forward biases the electrostatic discharge protection device with a biasing device to prevent the second radio frequency signal from reaching the other receiver circuitry.

The receiver and transmitter discussed above may be part of a transceiver, which may be implemented in a mobile phone, a personal digital assistant, a camera, a video camera, or other known communication device that uses radio frequency signals for exchanging data. However, the receiver with the high energy RF protection may be used in other circumstances in which the receiver may be damaged by high energy RF signals.

One advantage of the circuit shown in FIG. 5 is that less space than a conventional receiver is required to implement the insulation device of the receiver as only the biasing device is added while the ESD protection diodes are part of the receiver. On the contrary, the conventional receiver uses a large MOSFET switch or other bulky switches, which require considerable space and does not make use of existing ESD protection diodes. In addition, the circuit shown in FIG. 5 does not need a predetermined electric distance between the input 28 and the receiver 14 or a line transmission to the receiver having predetermined properties, as for example, other devices which require a fourth wavelength distance between the ESD circuit and the input port.

The disclosed exemplary embodiments provide a communication device and a method for insulating a receiver from a transmitter. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a wireless communication device, a telecommunication network, or as a method. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

The present exemplary embodiments may be implemented in a user terminal, a base station, and generally in a wireless communication network or system including both the user terminal and the base station. The exemplary embodiments may also be implemented in an application specific integrated circuit (ASIC), or a digital signal processor. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. A processor in association with software may be used to implement a radio frequency transceiver for use in the user terminal, the base station or any host computer. The user terminal may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor.

What is claimed is:

1. A transceiver comprising:
   a transmitter configured to transmit a first radio frequency signal;
   a switching device connected to the transmitter and configured to receive and transmit the first radio frequency signal to an antenna;
   a receiver connected to the switching device via an input and configured to receive a second radio frequency signal from the switching device, the receiver including an electrostatic discharge protection device connected to the input;
   a biasing device connected to the electrostatic discharge protection device and configured to forward bias the electrostatic discharge protection device; and
   a control device configured to control the biasing device such that the biasing device applies a forward bias to the electrostatic discharge protection device when the receiver is idle or the transmitter is transmitting the first radio frequency signal.

2. The transceiver of claim 1, wherein the biasing device is directly connected to the electrostatic discharge protection device such that no other electrical component is present between the biasing device and the electrostatic discharge protection device.

3. The transceiver of claim 1, wherein the electrostatic discharge protection device comprises:
at least one diode connected between ground and the input of the receiver.

4. The transceiver of claim 1, wherein the biasing device is connected to the input of the receiver.

5. The transceiver of claim 4, wherein the electrostatic discharge protection device is configured to protect the receiver from a voltage produced due to electrostatic discharge.

6. The transceiver of claim 5, wherein the biasing device is configured to control only the electrostatic discharge protection device.

7. The transceiver of claim 1, wherein the biasing device comprises at least one of:
a transistor, a diode, a resistor, an inductor or a combination thereof.

8. The transceiver of claim 1, further comprising:
a control device configured to control the biasing device such that the biasing device does not apply a forward bias to the electrostatic discharge protection device when the receiver is on or the transmitter is off.

9. A mobile communication device comprising:
a transceiver including:
a transmitter configured to transmit a first radio frequency signal;
a switching device connected to the transmitter and configured to receive and transmit the first radio frequency signal to an antenna;
a receiver connected to the switching device via an input and configured to receive a second radio frequency signal from the switching device, the receiver including an electrostatic discharge protection device connected to the input;
a biasing device connected to the electrostatic discharge protection device and configured to forward bias the electrostatic discharge protection device; and
a control device configured to control the biasing device such that the biasing device applies a forward bias to the electrostatic discharge protection device when the receiver is idle or the transmitter is transmitting the first radio frequency signal.

10. A transceiver comprising:
means for transmitting a first radio frequency signal;
means for switching the first radio frequency signal to an antenna;
means for receiving a second radio frequency signal from the means for switching, the means for receiving including means for electrostatic discharge protection of the means for receiving;
means for forward biasing the means for electrostatic discharge protection; and
means for controlling the means for biasing such that the means for biasing applies a forward bias to the means for electrostatic discharge protection when the means for receiving is idle or the means for transmitting is transmitting the first radio frequency signal.

11. The transceiver of claim 10, wherein the means for biasing is directly connected to the means for electrostatic discharge protection.

12. The transceiver of claim 10, wherein the means for electrostatic discharge protection is configured to protect the means for receiving from a voltage produced due to electrostatic discharge.

13. The transceiver of claim 10, wherein the means for biasing is configured to control only the means for electrostatic discharge protection.

14. The transceiver of claim 10, wherein the means for electrostatic discharge protection includes at least a diode connected between ground and an input of the means for receiving.

15. The transceiver of claim 10, further comprising:
means for controlling the means for biasing such that the means for biasing does not apply a forward bias to the means for electrostatic discharge protection when the means for receiving is on or the means for transmitting is off.

16. A method for biasing a transceiver that transmits and receives radio frequency signals, the method comprising:
transmitting from a transmitter a first radio frequency signal;
leaking a second radio frequency signal, which is associated with the first radio frequency, to a receiver path, the receiver path including an electrostatic discharge protection device and other receiver circuitry;
forward biasing the electrostatic discharge protection device with a biasing device to prevent the second radio frequency signal from reaching the other receiver circuitry; and
controlling the biasing device such that the biasing device applies a forward bias to the electrostatic discharge protection device when the other receiver circuitry is idle or the transmitter is transmitting the first radio frequency signal.

17. The method of claim 16, further comprising:
controlling the biasing device such that the biasing device does not apply a forward bias to the electrostatic discharge protection device when the other receiver circuitry is on or the transmitter is off.

* * * * *